(12) United States Patent
Balmakhtar et al.

(10) Patent No.: US 12,022,383 B1
(45) Date of Patent: Jun. 25, 2024

(54) RADIO EXPOSURE FUNCTION FOR TELECOMMUNICATIONS NETWORKS

(71) Applicant: T-Mobile USA, Inc., Bellevue, WA (US)

(72) Inventors: Marouane Balmakhtar, Fairfax, VA (US); Lyle Walter Paczkowski, Mission Hills, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/506,998

(22) Filed: Nov. 10, 2023

(51) Int. Cl.
*H04W 48/16* (2009.01)
*H04W 48/18* (2009.01)
*H04W 88/12* (2009.01)

(52) U.S. Cl.
CPC ........... *H04W 48/16* (2013.01); *H04W 48/18* (2013.01); *H04W 88/12* (2013.01)

(58) Field of Classification Search
CPC ...... H04W 48/16; H04W 48/18; H04W 88/12
See application file for complete search history.

(56) References Cited

U.S. PATENT DOCUMENTS

| | | | |
|---|---|---|---|
| 6,862,622 B2 | 3/2005 | Jorgensen | |
| 7,558,240 B2 | 7/2009 | Chen et al. | |
| 7,843,900 B2 | 11/2010 | Gallagher et al. | |
| 8,190,191 B2 | 5/2012 | Livet et al. | |
| 8,463,231 B1 | 6/2013 | Williams | |
| 9,055,507 B2 | 6/2015 | Chami et al. | |
| 9,210,639 B2 | 12/2015 | Nenner | |
| 9,680,737 B2 | 6/2017 | Bindrim et al. | |
| 10,139,845 B2 | 11/2018 | Dzuban et al. | |
| 10,645,608 B2 | 5/2020 | Shaw et al. | |
| 11,064,370 B2 | 7/2021 | Fox et al. | |
| 11,071,032 B2 | 7/2021 | Parsay et al. | |
| 11,425,606 B1 * | 8/2022 | Al-Bado | H04W 88/18 |
| 11,683,334 B2 | 6/2023 | Shaw et al. | |
| 11,743,131 B2 | 8/2023 | Yang et al. | |
| 11,778,453 B2 | 10/2023 | Cai | |
| 11,785,633 B2 | 10/2023 | Xing | |

(Continued)

FOREIGN PATENT DOCUMENTS

| | | |
|---|---|---|
| CN | 1350741 A | 5/2002 |
| CN | 1788465 A | 6/2006 |

(Continued)

*Primary Examiner* — Julio R Perez
(74) *Attorney, Agent, or Firm* — Perkins Coie LLP

(57) ABSTRACT

Methods for resource and slice allocation for multi-mode operation in Open RAN architectures are described. A programmable radio exposure function switches between real-time and near-real-time modes of operation for a radio access network (RAN) intelligent controller of a telecommunications system. An application programming interface is exposed by the radio exposure function and performs radio resource management for the telecommunications system. The application programming interface communicates with services and/or applications to control RAN functions, and allocates RAN resources of the telecommunications system to a user equipment for the services and/or applications. A machine learning module is embedded within the radio exposure function and trained to identify network slices of the telecommunications system for the services and/or applications.

20 Claims, 7 Drawing Sheets

(56) References Cited

U.S. PATENT DOCUMENTS

| | | |
|---|---|---|
| 2006/0166664 A1 | 7/2006 | Livet et al. |
| 2006/0229057 A1 | 10/2006 | Farrugia et al. |
| 2010/0041403 A1 | 2/2010 | Khetawat et al. |
| 2011/0007682 A1 | 1/2011 | Islam et al. |
| 2020/0314700 A1 | 10/2020 | Da Silva et al. |
| 2021/0045193 A1* | 2/2021 | Mishra ................. H04W 88/14 |
| 2021/0184989 A1 | 6/2021 | Wu et al. |
| 2021/0185601 A1 | 6/2021 | Altay et al. |
| 2021/0258866 A1* | 8/2021 | Chou ................... H04W 48/16 |
| 2021/0337420 A1 | 10/2021 | Lo et al. |
| 2021/0400573 A1 | 12/2021 | Klatt |
| 2022/0150723 A1* | 5/2022 | Tsai ...................... H04W 28/08 |
| 2022/0167236 A1* | 5/2022 | Melodia ................. H04B 17/15 |
| 2022/0286837 A1 | 9/2022 | Yang et al. |
| 2022/0291961 A1* | 9/2022 | Saha ......................... G06F 9/50 |
| 2022/0303831 A1 | 9/2022 | Song et al. |
| 2022/0417759 A1 | 12/2022 | Poscher et al. |
| 2023/0007664 A1* | 1/2023 | Ravuri .............. H04W 72/1263 |
| 2023/0037228 A1 | 2/2023 | Panigrahi et al. |
| 2023/0062452 A1 | 3/2023 | Kim et al. |
| 2023/0079529 A1* | 3/2023 | Baldesi .................... G06N 3/08 370/329 |
| 2023/0129575 A1* | 4/2023 | Chou ................... H04W 24/10 370/329 |
| 2023/0164756 A1* | 5/2023 | Vankayala .......... H04W 72/121 370/329 |
| 2023/0239776 A1 | 7/2023 | Song et al. |
| 2023/0328535 A1 | 10/2023 | Trujillo |
| 2024/0040506 A1* | 2/2024 | Uziel ................ H04W 52/0229 |

FOREIGN PATENT DOCUMENTS

| | | |
|---|---|---|
| CN | 101427517 A | 5/2009 |
| CN | 106489249 A | 3/2017 |
| CN | 106603659 B | 8/2019 |
| CN | 105794298 B | 9/2019 |
| CN | 105830476 B | 5/2020 |
| EP | 1611715 A1 | 1/2006 |
| EP | 1969774 A2 | 9/2008 |
| EP | 1869840 B1 | 5/2010 |
| EP | 2213136 A1 | 8/2010 |
| EP | 2026624 B1 | 11/2013 |
| EP | 3170283 A1 | 5/2017 |
| EP | 1864464 B1 | 7/2017 |
| EP | 2315412 B1 | 7/2018 |
| EP | 3036937 B1 | 7/2021 |
| EP | 3020248 B1 | 5/2023 |
| EP | 4131894 B1 | 9/2023 |
| JP | 2007531423 A | 11/2007 |
| JP | 4654300 B2 | 12/2010 |
| JP | 4680890 B2 | 2/2011 |
| JP | 4933528 B2 | 2/2012 |
| JP | 5260642 B2 | 5/2013 |
| KR | 20110058907 A | 6/2011 |
| KR | 20160083103 A | 7/2016 |
| KR | 102243979 B1 | 4/2021 |
| KR | 20210060586 A | 5/2021 |
| WO | 0176276 A2 | 10/2001 |
| WO | 03084096 A1 | 10/2003 |
| WO | 2004084500 A1 | 9/2004 |
| WO | 2006100459 A2 | 9/2006 |
| WO | 2006100473 A1 | 9/2006 |
| WO | 2007078663 A2 | 7/2007 |
| WO | 2008155314 A1 | 12/2008 |
| WO | 2009000696 A1 | 12/2008 |
| WO | 2009047308 A1 | 4/2009 |
| WO | 2012148442 A1 | 11/2012 |
| WO | 2013006219 A1 | 1/2013 |
| WO | 2013074600 A1 | 5/2013 |
| WO | 2013079114 A1 | 6/2013 |
| WO | 2015005853 A2 | 1/2015 |
| WO | 2020074610 A1 | 4/2020 |
| WO | 2021104640 A1 | 6/2021 |
| WO | 2021215847 A1 | 10/2021 |
| WO | 2021226634 A1 | 11/2021 |
| WO | 2022260867 A1 | 12/2022 |
| WO | WO-2023163259 A1 * | 8/2023 |

* cited by examiner

RADIO EXPOSURE FUNCTION FOR TELECOMMUNICATIONS NETWORKS

BACKGROUND

Next-generation telecommunications networks promise faster speeds, lower latencies, and the ability to connect to more devices simultaneously. However, next-generation networks can pose security challenges from the volume of devices that will be connected and the sensitive nature of the data they will handle. Moreover, while next-generation networks are designed to work with a larger volume of data and devices than their predecessor networks, the rapid growth in the number of connected devices can lead to network congestion. Congestion could result in slower speeds and reduced performance, particularly in densely populated urban areas. Securely exposing the services and capabilities provided by next-generation networks while addressing the varying communication needs of different types of connected devices is therefore required.

BRIEF DESCRIPTION OF THE DRAWINGS

Detailed descriptions of implementations of the present technology will be described and explained through the use of the accompanying drawings.

Figure 1:
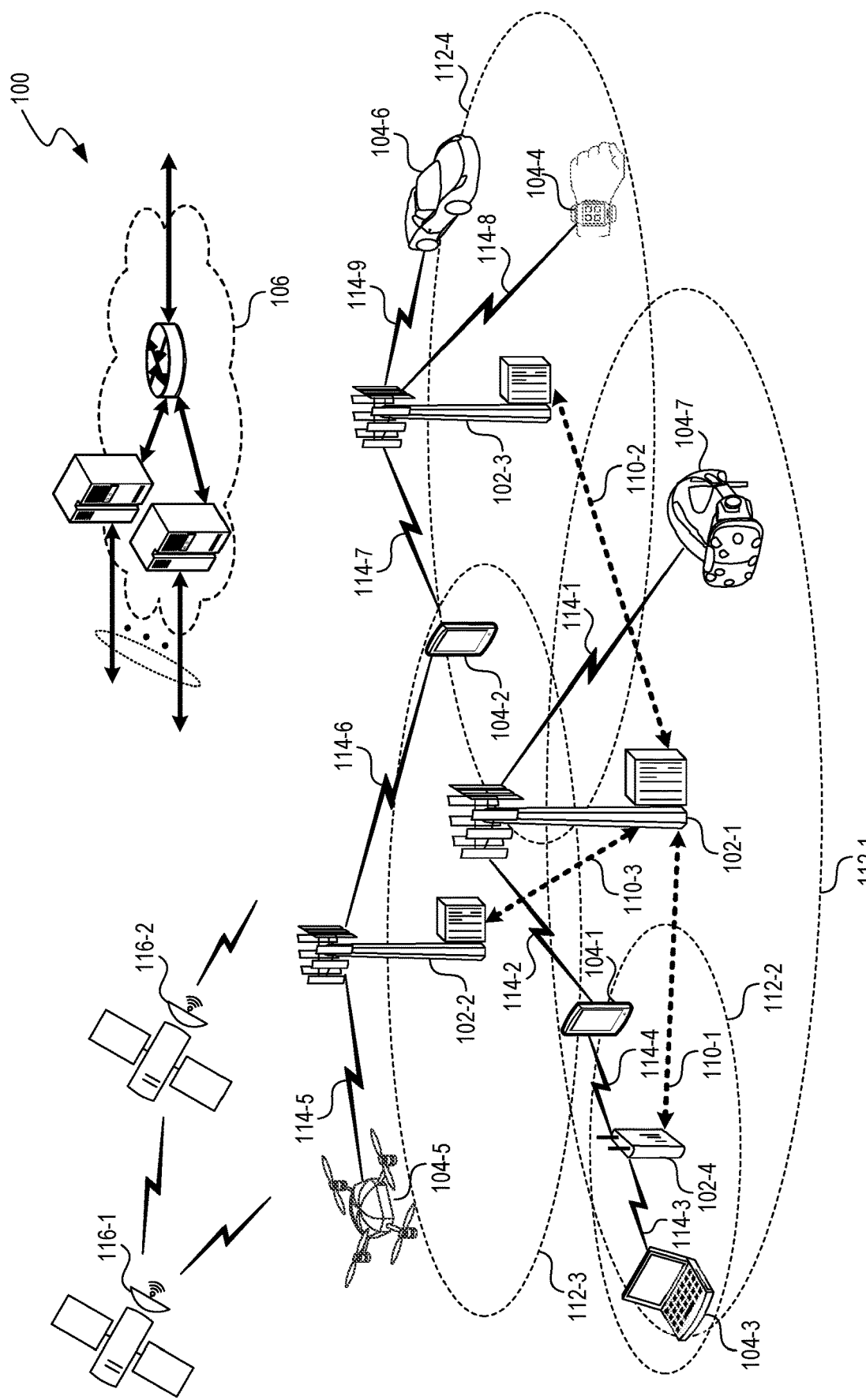
FIG. 1 is a block diagram that illustrates an example wireless communications system that can implement aspects of the present technology.

The technologies described herein will become more apparent to those skilled in the art from studying the Detailed Description in conjunction with the drawings. Embodiments or implementations are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Next-generation telecommunications networks, such as 6G, 7G, and 8G networks, are being designed to support applications beyond current mobile use scenarios. Next-generation networks are expected to support demanding and diverse applications such as ubiquitous instant communications, pervasive intelligence, and the highly distributed Internet of things (HDIoT). Mobile network operators are expected to adopt flexible, decentralized business models for 6G, having local spectrum licensing, spectrum sharing, infrastructure sharing, and intelligent automated management underpinned by mobile edge computing, artificial intelligence (AI)/machine learning (ML), short-packet communication, and blockchain technologies. However, there remains a lack of universally accepted standards for next-generation networks, such as 6G. Moreover, self-organizing network technology, which could be used for next-generation networks, has not been generally adopted, partly because of proprietary implementations that tie it to specific manufacturers. Securely exposing the services and capabilities provided by next-generation networks while addressing the varying communication needs of different types of connected devices is therefore required.

This document discloses methods, systems, and apparatuses for improved resource and slice allocation for multimode operation in Open RAN architectures. The methods disclosed are used to operate next-generation telecommunications network architectures including a radio exposure function. The radio exposure function is a network abstraction layer that enhances the capabilities of a radio system to expand the services provided by the network exposure function of a next-generation telecommunications network. The radio exposure function operates to decentralize radio access network (RAN) functions, and create multiple virtual networks corresponding to a particular set of user equipment (e.g., to provide high-bandwidth data for gaming users or low-latency data for industrial applications). In some implementations, the radio exposure function automates radio resource management, generates network slices on-the-fly, and scales up or down virtual network functions for improved functionality.

The disclosed programmable radio exposure function switches between real-time and near-real-time modes of operation for a RAN intelligent controller of a telecommunications system. An application programming interface is exposed by the radio exposure function and performs radio resource management for the telecommunications system. The application programming interface can also communicate with services and/or applications to control RAN functions, and allocate RAN resources of the telecommunications system to user equipment for the services and/or applications. A machine learning module is embedded within the radio exposure function and trained to identify network slices of the telecommunications system for the services and/or applications to use. The machine learning module further analyzes data received from the user equipment to detect violations of security constraints of the telecommunications system.

In some implementations, the radio exposure function receives mode selection requests from services and/or applications executing on user equipment connected to the telecommunications system. In response to the mode selection requests, the radio exposure function selects operational modes from real-time and near-real-time modes of operation of a RAN intelligent controller of the telecommunications system. The application programming interface is exposed by the radio exposure function to the services and/or applications, and allocates RAN resources of the telecommunications system to the user equipment based on the operational modes. The RAN resources are for executing the services and/or applications by the user equipment. The application programming interface provides access to RAN functions of the telecommunications system to the services and/or applications. Thus, the services and/or applications can access the RAN functions. The services and/or applications are configured to control the at RAN functions using the RAN intelligent controller. A machine learning module is embedded within the radio exposure function, and identifies network slices of the telecommunications system for the services and/or applications to access the telecommunications system.

The benefits and advantages of the implementations described herein include the automatic modification of radio parameters in real time to address the service demands of different user equipment. Because a network abstraction layer is implemented and distributed by the radio exposure function, multiple RAN intelligent controllers can be deployed for greater service capabilities compared to traditional networks. Network elements can be analyzed and modified by the radio exposure function on-the-fly to dynamically modify the services offered. Moreover, next-generation networks implemented using the radio exposure function provide enhanced capabilities similar to the Non-3GPP Interworking Function (N3IWF) for interworking between untrusted non-3GPP networks and the 5G Core.

The disclosed apparatuses expand and streamline near-real-time, real time, and non-real-time RAN intelligent controller offerings with the use of the predictive capabilities of the radio exposure function, such that quality of experience is enhanced compared to conventional network technologies. The radio exposure function also enhances the use of beamforming and traffic steering across a variety of radio types—some of which can be in simultaneous use on a single user equipment. In addition, by using machine learning architectures, such as convolutional neural networks (CNNs), which use shared weights in convolutional layers, the disclosed implementations enable reduction of memory footprint and improvement in computational performance.

Operation of the radio exposure function as disclosed herein causes a reduction in greenhouse gas emissions compared to traditional methods for network slicing. Every year, approximately 40 billion tons of $CO^2$ are emitted around the world. Power consumption by digital technologies including telecommunications networks account for approximately 4% of this figure. Further, conventional networks can sometimes exacerbate the causes of climate change. For example, the average U.S. power plant expends approximately 600 grams of carbon dioxide for every kWh generated. The implementations disclosed herein for operating the radio exposure function can mitigate climate change by reducing and/or preventing additional greenhouse gas emissions into the atmosphere. For example, the use of machine learning to avoid conventional RAN partitioning as described herein reduces electrical power consumption and the amount of data transported and stored compared to traditional methods for modifying radio parameters. In particular, by enhancing the use of beamforming and traffic steering, the disclosed systems provide increased efficiency compared to traditional methods.

Moreover, in the U.S., datacenters are responsible for approximately 2% of the country's electricity use, while globally they account for approximately 200 terawatt Hours (TWh). Transferring 1 GB of data can produce approximately 3 kg of $CO^2$. Each GB of data downloaded thus results in approximately 3 kg of $CO^2$ emissions or other greenhouse gas emissions. The storage of 100 GB of data in the cloud every year produces approximately 0.2 tons of $CO^2$ or other greenhouse gas emissions. Expanding the capabilities of the non-real time and near-real time RAN intelligent controllers using the radio exposure function embodiments disclosed herein reduces the amount of data transported and stored, and obviates the need for wasteful $CO^2$ emissions. Therefore, the disclosed implementations for operation of the radio exposure function mitigates climate change and the effects of climate change by reducing the amount of data stored and downloaded in comparison to conventional network technologies.

The description and associated drawings are illustrative examples and are not to be construed as limiting. This disclosure provides certain details for a thorough understanding and enabling description of these examples. One skilled in the relevant technology will understand, however, that the embodiments can be practiced without many of these details. Likewise, one skilled in the relevant technology will understand that the embodiments can include well-known structures or features that are not shown or described in detail, to avoid unnecessarily obscuring the descriptions of examples.

Wireless Communications System

FIG. 1 is a block diagram that illustrates a wireless telecommunications network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the wireless telecommunications network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
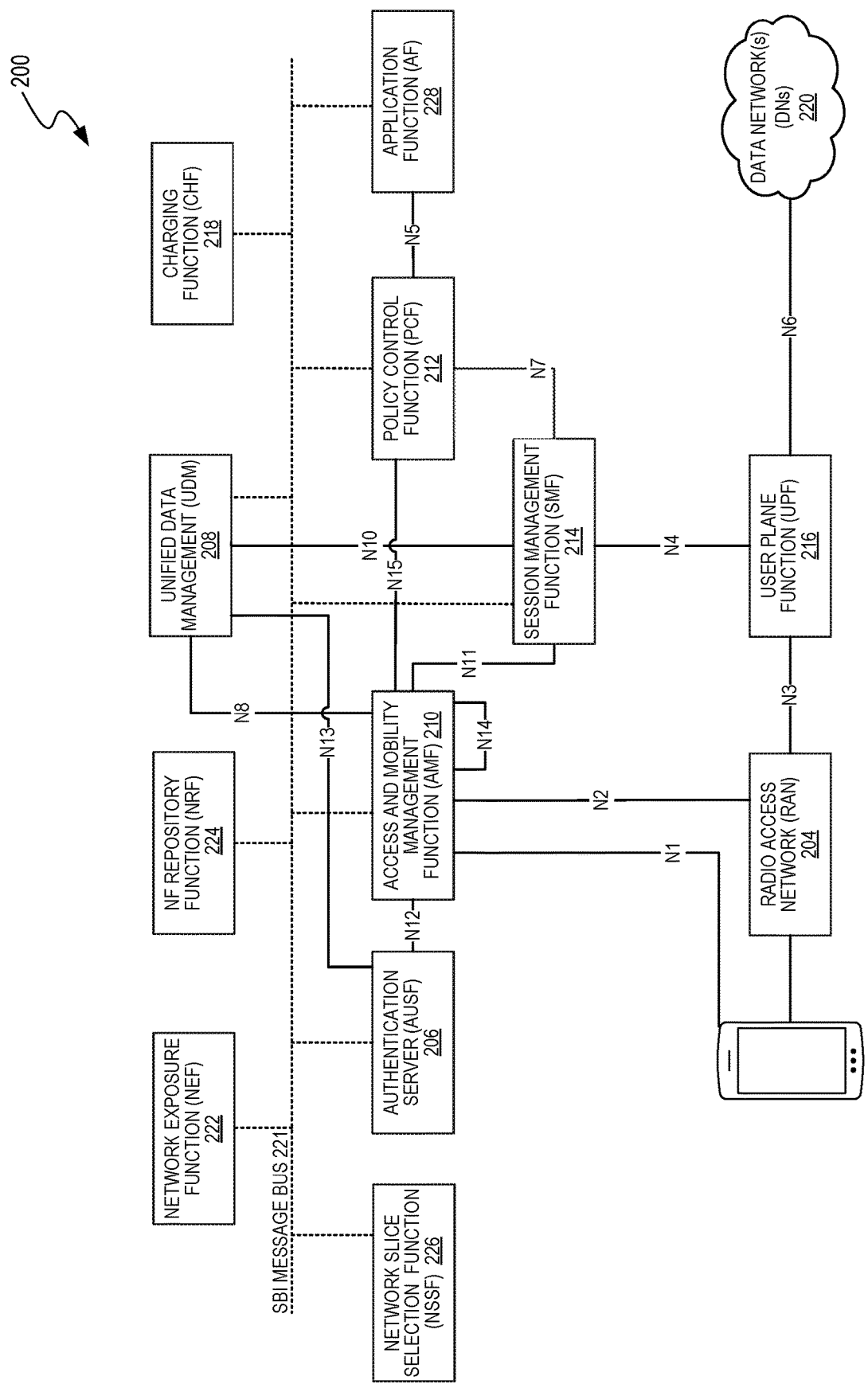
FIG. 2 is a block diagram that illustrates an architecture including 5G Core network functions that can implement aspects of the present technology.

FIG. 2 is a block diagram that illustrates an architecture 200 including 5G Core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given the large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface, and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Resource and Slice Allocation for Multi-Mode Operation in Open Ran

Figure 3:
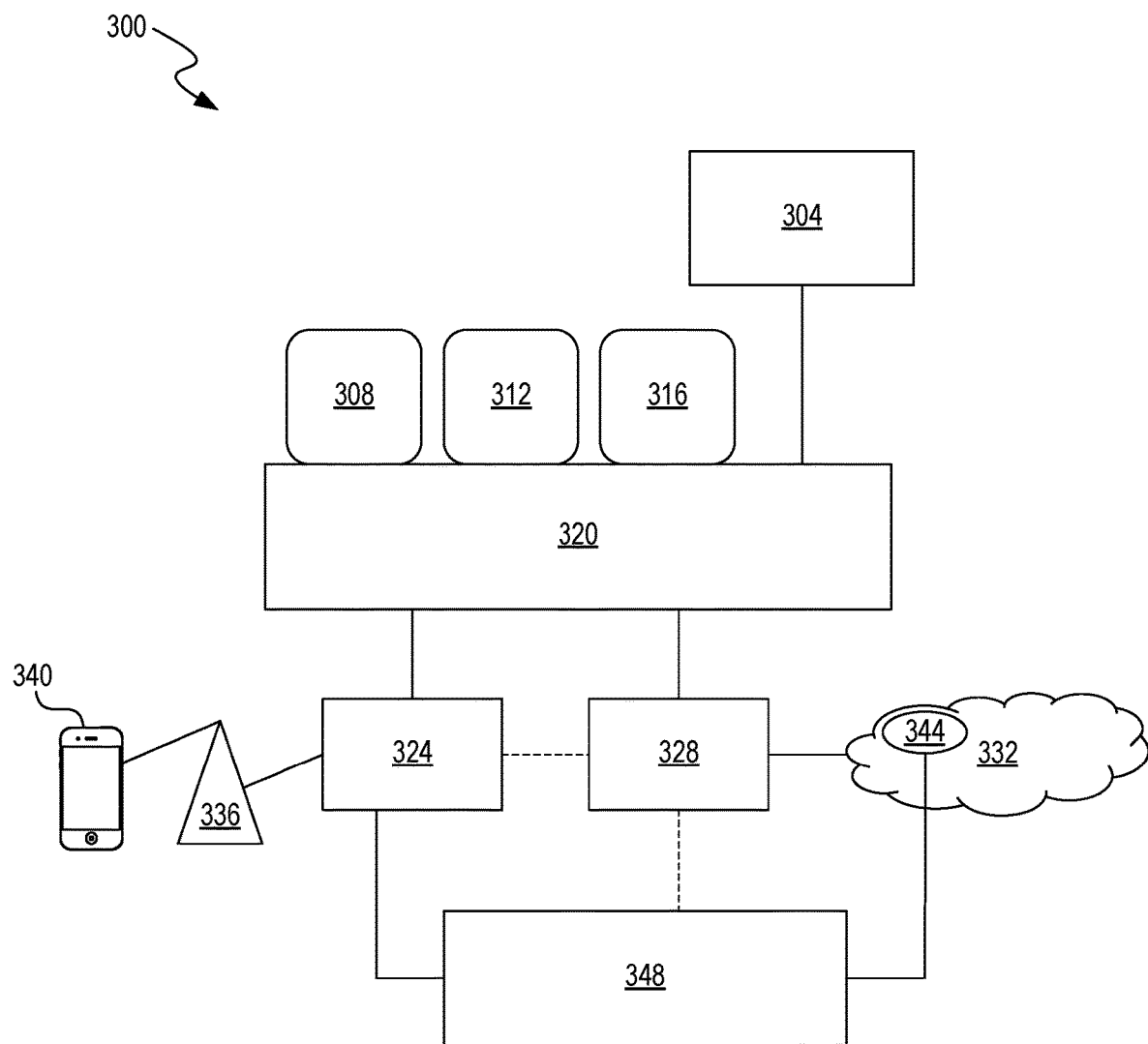
FIG. 3 is a block diagram that illustrates an example telecommunications system.

FIG. 3 is a block diagram that illustrates an example telecommunications system 300 including a radio exposure function abstractor and service administrator 348. The telecommunications system 300 includes a radio exposure function (illustrated and described in more detail with reference to FIG. 4). The telecommunications system 300 is implemented using components of the example computer system 700 illustrated and described in more detail with reference to FIG. 7. For example, the telecommunications system 300 can be implemented using processor 702 and instructions 708 programmed in the memory 706 illustrated and described in more detail with reference to FIG. 7. Likewise, implementations of the telecommunications system 300 can include different and/or additional components or be connected in different ways.

The user equipment 340 is communicatively coupled to the telecommunications system 300. The user equipment 340 is similar to or the same as wireless device 104 illustrated and described in more detail with reference to FIG. 1. The telecommunications system 300 includes radio unit 336, which handles the digital front end (DFE) and parts of the PHY layer as well as the digital beamforming functionality. The radio unit 336 is communicatively coupled to the distributed unit 324, which is the main processing unit that is responsible for the High Physical, MAC, and RLC protocols in the radio access network (RAN) protocol stack. The centralized unit 328 provides support for the higher layers of the protocol stack such as SDAP, PDCP and RRC. More than one distributed unit 324 and more than one centralized unit 328 can be implemented, as is illustrated and described in more detail with reference to FIG. 4.

The radio exposure function abstractor and service administrator 348 is communicatively coupled to the distributed unit 324, the centralized unit 328, and the NSSF 344. The NSSF 344 is similar to or the same as the NSSF 226 illustrated and described in more detail with reference to FIG. 2. The 5G/6G mobile core 332 also includes an NEF that is similar to or the same as the NEF 222 illustrated and described in more detail with reference to FIG. 2. The radio exposure function abstractor and service administrator 348 include control entities that interact with the distributed unit 324 and centralized unit 328, facilitated by the NSSF 344, to provide more efficient resource management, service provisioning, and optimization in a 5G/6H network architecture compared to conventional methods, thus reducing power consumption and redundant data storage/transport.

An included radio exposure function abstractor in the radio exposure function abstractor and service administrator 348 can function as an intermediary interface between services and/or applications and the RAN functions of the distributed units 324. The telecommunications system 300 includes at least one application programming interface exposed by the radio exposure function to services and/or applications. An example application programming interface 412 is illustrated and described in more detail with reference to FIG. 4. The radio exposure function abstractor can receive commands, policies, or optimization requests (via application programming interfaces) from external services and/or applications and translates them into actionable directives for the distributed units 324. An included service administrator in the radio exposure function abstractor and service administrator 348 manages and provisions services, such as network slicing and Quality of Service (QoS), coordinating with the distributed units 324 to provide that the allocated resources align with the service requirements. The service administrator can set policies and Service Level Agreements (SLAs) for resource usage and traffic handling at the network edge.

The NSSF 344 can guide the decision-making process by assisting in selecting the appropriate network slices based on specific service requirements and policies set by the service administrator. The NSSF 34 functions by communicating the directives to the radio exposure function abstractor (via application programming interfaces), which in turn translates them into actions that need to be executed across the distributed units 324 and centralized unit 328. Through the application programming interfaces, the above-mentioned entities and network components communicate and collaborate in a 5G/6G network architecture. For example, the application programming interfaces disclosed herein facilitate the exchange of information, policies, and instructions, allowing for the orchestration, control, and optimization of resources and services across the 5G/6G network.

The telecommunications system 300 includes a near-real-time RAN intelligent controller 320 (described in more detail with reference to FIG. 5). The near-real-time RAN intelligent controller 320 is a software-defined component of an open RAN architecture that can be used for controlling and optimizing radio access network functions. The near-real-time RAN intelligent controller 320 functions as a component of the open RAN disaggregation strategy, bringing multivendor interoperability, intelligence, agility, and programmability to RAN. The telecommunications system 300 further includes a non-real-time RAN intelligent controller 304 (described in more detail with reference to FIG. 5). Because a network abstraction layer is implemented and distributed by the radio exposure function disclosed herein, multiple RAN intelligent controllers can be deployed for greater service capabilities compared to traditional networks.

The policy applications 308 are related to creating, implementing, and maintaining policies in the network to determine how the network, devices or services should behave according to pre-defined end-user or network conditions. The Self-Organizing Networks (SON) applications 312 relate to adaptive beam management, slice-aware optimization, edge orchestration, and/or proactive fault management. The partner relationship management (PRM) applications 316 relate to the software, processes, and strategies used to streamline business processes with partners.

Figure 4:
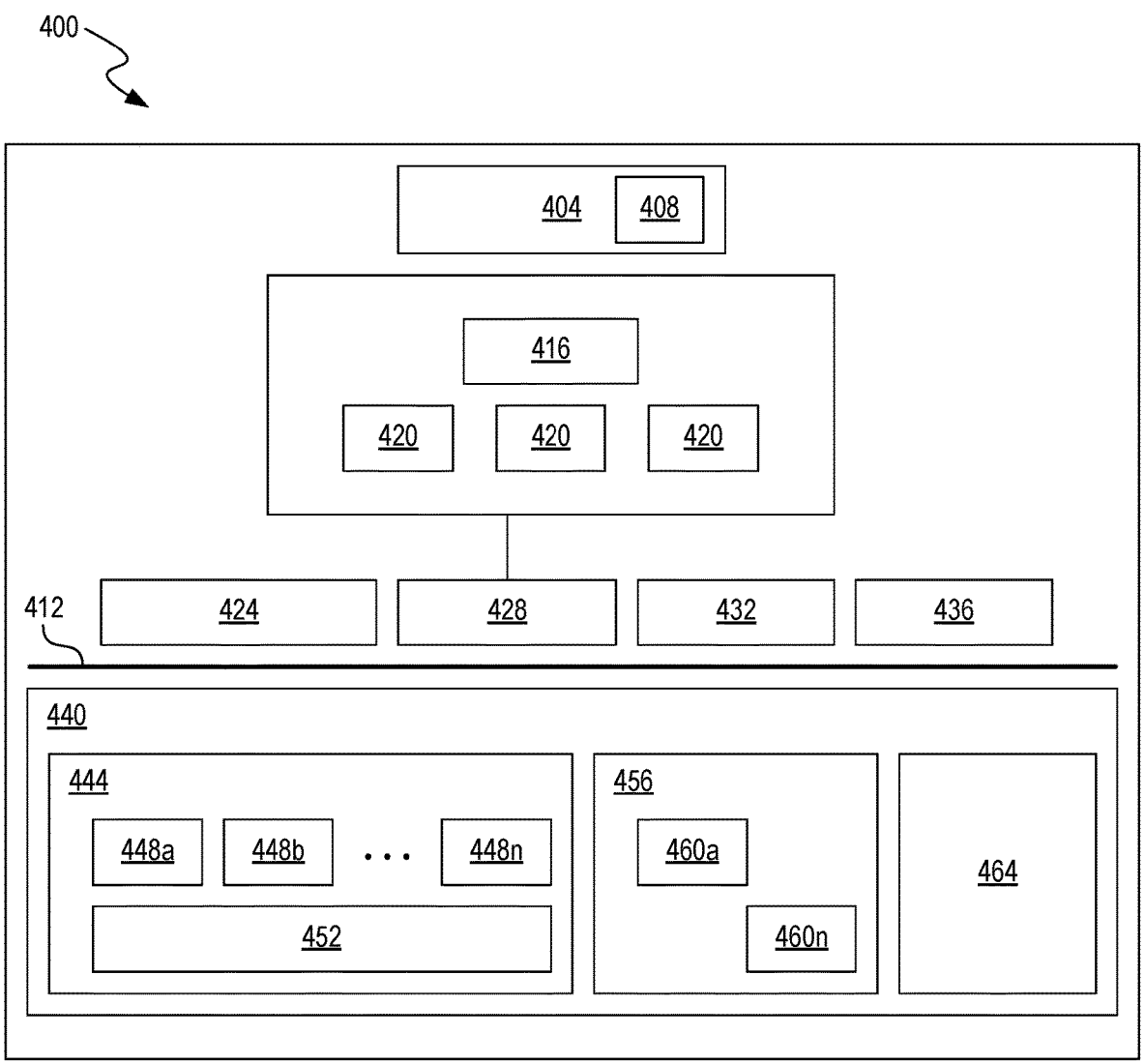
FIG. 4 is a block diagram that illustrates an example telecommunications system including a radio exposure function.

FIG. 4 is a block diagram that illustrates an example telecommunications system 400 including a radio exposure function 440. The telecommunications system 400 is implemented using components of the example computer system 700 illustrated and described in more detail with reference to FIG. 7. For example, the telecommunications system 400 can be implemented using processor 702 and instructions 708 programmed in the memory 706 illustrated and described in more detail with reference to FIG. 7. Likewise, implementations of the telecommunications system 400 can include different and/or additional components or be connected in different ways.

The user equipment 404 is communicatively coupled to the telecommunications system 400. The user equipment 404 is similar to or the same as wireless device 104 illustrated and described in more detail with reference to FIG. 1. The user equipment 404 can be provisioned with a user equipment route selection policy 408 that provides information on which Packet Data Unit session on a network slice a given service and/or application should use when it is activated. The telecommunications system 400 includes centralized unit 416, which is the same as or similar to centralized unit 328 illustrated and described in more detail with reference to FIG. 3. The telecommunications system 400 includes multiple distributed units 420, which are the same as or similar to distributed unit 324 illustrated and described in more detail with reference to FIG. 3.

The telecommunications system 400 includes untrusted non-3GPP network 424 that interworks with the 5G Core Network (5GCN) using the non-3GPP Interworking Function (N3IWF). An example 5G Core Network (5GCN) is illustrated and described in more detail with reference to FIG. 2. The N3IWF acts as a gateway for the 5GCN with support for N2 and N3 interfaces towards the 5GCN. Additionally, N3IWF provides a secure connection for the user equipment 404 accessing the 5GCN over the non-3GPP access network 424 with support for IPsec between the user equipment 404 and the N3IWF. For the trusted non-3GPP network 428, an operator has control of the trusted non-3GPP access point (TNAP) and the radio link access. The encryption is controlled by the operator or there is trust in the security offered by the trusted non-3GPP access network 428.

The telecommunications system 400 includes a 5G RAN 432, which is the same as or similar to the RAN 204 illustrated and described in more detail with reference to FIG. 2. The telecommunications system 400 includes a FutureG RAN 436 (e.g., for 6G, 7G, and/or 8G). The FutureG RAN 436 is used for functions such as Aerial Radio Access Network (ARAN), AI-enabled Radio Access Network, and Open Radio Access Network (O-RAN). The telecommunications system 400 includes the programmable radio exposure function 440, which is a network abstraction layer that enhances the capabilities of a radio system to expand the services provided by the network exposure function of a next-generation telecommunications network. An example network exposure function 222 is illustrated and described in more detail with reference to FIG. 2. In some implementations, the programmable radio exposure function 440 is located within the 5G Core of the telecommunications system, e.g., connected to the SBI message bus 221 (see FIG. 2). In some implementations, the radio exposure function 440 is located outside the 5G Core of the telecommunications system 400. For example, the radio exposure function 440 can be located within the radio exposure function abstractor and service administrator 348 (outside the 5GCN) as illustrated and described in more detail with reference to FIG. 3.

The radio exposure function 440 operates to decentralize RAN functions, and create multiple virtual networks corresponding to a particular set of user equipment 404 (e.g., to provide high-bandwidth data for gaming users or low-latency data for industrial applications). The radio exposure function 440 automates radio resource management, generates network slices on-the-fly, and scales up or down virtual network functions for improved functionality. In some implementations, a machine learning module is embedded within the radio exposure function 440. The machine learning module is implemented using components of the AI System 600 illustrated and described in more detail with reference to FIG. 6. The machine learning module is trained to identify at least one network slice of the telecommunications system for at least one service and/or application to access the telecommunications system (as described in more detail with reference to FIG. 5). Example machine learning training methods are described in more detail with reference to FIG. 6.

In some implementations, the service and/or application is an online gaming application. The network slice identified by the machine learning module is a high-speed data slice for the online gaming application. The network slicing performed according to the embodiments disclosed herein enable multiple networks (virtualized and independent) to be created on top of a common physical infrastructure. Each "slice" or portion of the telecommunications network 400 can be allocated based on the specific needs of the application, use case, or customer. For example, services such as smart-parking meters require high reliability and security, other 5G use cases (such as driver-less cars) need ultra-low latency (URLLC) and high data speeds. The network slicing enabled by the radio exposure function 440 supports diverse services and reassigns resources as needed from one virtual network slice to another, obviating the need for the one-size-fits-all approach to service delivery. In some implementations, the service and/or application being executed is an industrial application. The network slice identified by the machine learning module is a low-latency data slice for the industrial application (e.g., closed-loop robotic control or video-driven machine-human interaction).

The machine learning module can be trained to analyze data received from the user equipment 404 to detect that the user equipment 404 has violated a security constraint of the telecommunications system 400. The machine learning module analyzes data (either received from the user equipment 404 or from the network), such as data related to a service and/or application, data regarding transport layers identities and/or edge network functions, and/or sensitive location data. In response to detecting that the user equipment 404 has violated a security constraint of the telecommunications system 400, the application programming interfaces 412 (described in more detail below) prevents the user equipment 404 from accessing a particular network slice corresponding to particular RAN resources. In some implementations, the application programming interfaces 412 prevents the user equipment 404 from accessing the allocated RAN resources in response to detecting that the user equipment 404 has violated the security constraint.

The telecommunications system 400 includes one or more application programming interfaces 412 exposed by the radio exposure function to the service and/or application. The application programming interface 412 provides access to at least one RAN function of the telecommunications system 400 to the service and/or application. Thus, the services and/or applications can access the RAN functions. The application programming interface 412 can allocate RAN resources of the telecommunications system 400 to the user equipment 404 for executing the service and/or application. Example RAN resources are described in more detail with reference to FIG. 5. In some implementations, the machine learning module is trained to determine the RAN resources for the application programming interface 412 to allocate based on the service and/or application and data received from the user equipment 404.

The radio exposure function 440 is configured to implement the real-time modes 456 and near-real-time modes 444 of operation of the RAN intelligent controllers of the telecommunications system 400 in accordance with an open RAN architecture. Open RAN architectures are based on interoperability and standardization of RAN elements including a unified interconnection standard for white-box hardware and open source software elements from different vendors. Open RAN architectures integrate a modular base station software stack on off-the-shelf hardware which allows baseband and radio unit components from different suppliers to operate seamlessly together. The radio exposure function 440 can switch between the real-time modes 456 and near-real-time modes 444 of operation, e.g., based on mode requests. The near-real-time modes 444 of operation enable control of the infrastructure of the 5G RAN 432 and the FutureG RAN 436 at the cloud edge. Because a network abstraction layer is implemented and distributed by the radio exposure function 440, multiple RAN intelligent controllers can be deployed for greater service capabilities compared to traditional networks. The near-real-time RAN intelligent controller hosts cloud-native microservice-based applications 448a, 448b, 448n. In the near-real-time modes 444 of operation, the microservice-based applications 448 enhance the RAN's spectrum efficiency.

The radio resource management function 452 performs management of radio resources and transmission characteristics, such as modulation scheme, transmit power, beamforming, user allocation, data rates, handover criteria, and error coding scheme. As noted above, the telecommunications system 400 includes an application programming interface 412 exposed by the radio exposure function 440 to the service and/or application. Example services and applications are described in more detail with reference to FIG. 5. The application programming interface 412 performs at least one of the above-noted radio resource management functions of the telecommunications system 400.

The real-time modes 456 of operation are performed within the telco edge cloud or regional cloud for intelligent edge control of RAN nodes and resources with optimization actions that typically take less than 10 milliseconds to complete. The real-time modes 456 can receive policy guidance from the near-real-time RAN intelligent controller 320 and provide policy feedback through specialized applications 460a-460n. The near-real-time RAN intelligent controller is illustrated and described in more detail with reference to FIG. 5. The future modes 464 of operation, e.g., for 6G, 7G, and 8G networks, support ubiquitous instant communications, pervasive intelligence, and IoT underpinned by mobile edge computing, artificial intelligence (AI), short-packet communication and blockchain technologies.

In some applications, the application programming interface 412 configures the user equipment 404 to communicate with the radio exposure function 440. For example, the NG-RAN and 5G Core are used. The user equipment 404 communicates with the NG-RAN over a radio interface named Uu, and the NG-RAN communicates with the radio exposure function 440 within the 5G Core over the NG interface. The user equipment 404 can further be configured to access a citizens broadband radio service. In this manner, the user equipment 404 communicates with industrial or other devices over the 150 MHz wide broadcast band of the 3.5 GHz band (3550 MHz to 3700 MHz). The industrial devices can be connected to farm equipment, factory equipment, or deployed across the campus of an organization. The industrial devices may not on their own have cellular capability, e.g., a CBRS device connected to a combine harvester. The application programming interface 412 configures a computer device (e.g., connected to farm equipment, factory equipment, or deployed across a campus) to communicate with the user equipment 404 via the telecommunications system 400. As noted, the computer device lacks access to the citizens broadband radio service but can communicate with other industrial devices and with the telecommunications system 400 using the embodiments disclosed herein.

In some implementations, the telecommunications system 400 processes information received from multiple user equipments 404 in a batch mode. RAN resources of the telecommunications system 400 are allocated to the multiple user equipments 404 in the batch mode. The batch mode is designed for handling information/data and tasks in batches (e.g., in industrial and HDIoT settings). The batch mode enables the telecommunications system 400 to process data and execute operations on an even larger scale, optimizing resource utilization by processing tasks in bulk, compared to executing operations in real-time or near-real-time.

Figure 5:
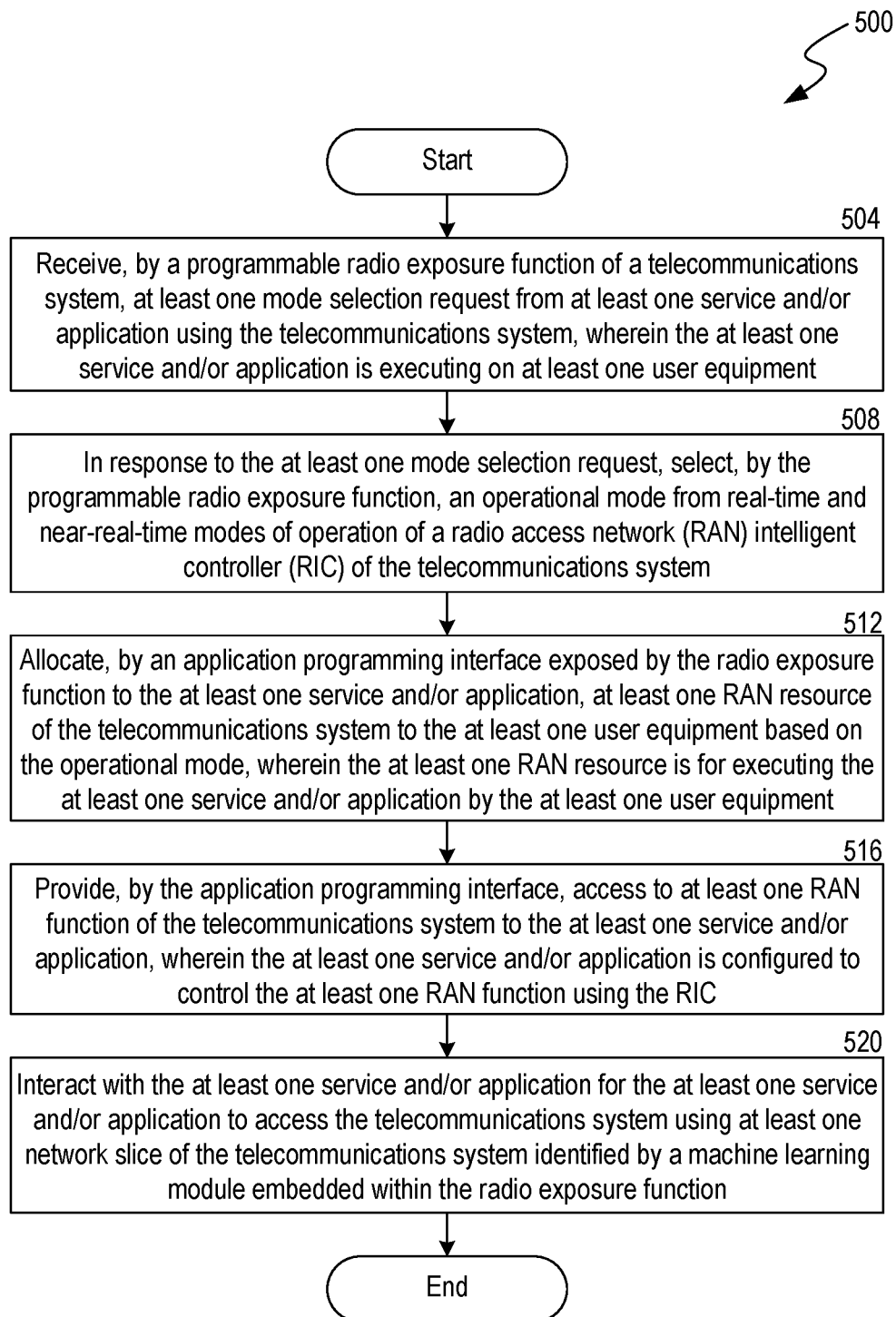
FIG. 5*a* is flow diagram that illustrates an example process for operating a radio exposure function for telecommunications networks.

FIG. 5 is a flow diagram that illustrates an example process 500 for operating a radio exposure function for telecommunications networks. In some implementations, the process is performed by telecommunications system 400 illustrated and described in more detail with reference to FIG. 4. In some implementations, the process is performed by a computer system, e.g., example computer system 700 illustrated and described in more detail with reference to FIG. 7. Particular entities, for example, AI system 600, perform some or all of the steps of the process in other implementations. The AI system 600 is illustrated and described in more detail with reference to FIG. 6. Likewise, implementations can include different and/or additional steps or can perform the steps in different orders.

In act 504, a programmable radio exposure function of a telecommunications system receives at least one mode selection request from at least one service and/or application that is using the telecommunications system. An example programmable radio exposure function 440 is illustrated and described in more detail with reference to FIG. 4. The service and/or application is executing on a user equipment, e.g., user equipment 404 illustrated and described in more detail with reference to FIG. 4. The service and/or application executing on the user equipment can be an enhanced mobile broadband service and/or application, a mission-critical communications service and/or application, or an IoT service and/or application.

The mode selection request indicates a selection between real-time, non-real-time, and near-real-time modes of operation. The non-real-time modes can be an element of an operator's centralized Service Management and Orchestration (SMO) Framework, as defined by the O-RAN Alliance. In such modes, the non-real-time RAN intelligent controller enables greater than 1-second control of RAN elements and their resources. An example non-real-time RAN intelligent controller 304 is illustrated with reference to FIG. 3. Network data, performance metrics, and subscriber data can also be used to provide AI-based recommendations for network optimization and policy guidance. The near-real-time modes of operation are performed by a near-real-time RAN intelligent controller residing within a telco edge or regional cloud and typically enables network optimization actions that take between 10 milliseconds to one second to complete. An example near-real-time RAN intelligent controller 320 is illustrated with reference to FIG. 3.

In act 508, in response to the mode selection request, the programmable radio exposure function selects an operational mode from the real-time and near-real-time modes of operation of the RAN intelligent controllers of the telecommunications system. Each RAN intelligent controller can be cloud-native and forms a major component of an open, virtualized network of RAN. The RAN intelligent controllers enable the programmability of networks, as well as intelligence and disaggregation on the telecommunications network 400.

In act 512, an application programming interface is exposed by the radio exposure function to the service and/or application. An example application programming interface 412 is illustrated and described in more detail with reference to FIG. 4. The application programming interface is a type of software interface, offering a service to other pieces of software. By exposing the application programming interface, the radio exposure function enables developers to build on top of the telecommunications system 400. The application programming interface allocates at least one RAN resource of the telecommunications system to the user equipment based on the operational mode. The RAN resources are the hardware and software resources of the part of the telecommunications system 400 implementing a radio access technology. The RAN resources reside between the user equipment 404 and provides connection with the core network. The RAN resource is for executing the service and/or application by the user equipment. Allocating the at least one RAN resource to the at least one user equipment based on the operational mode reduces greenhouse gas emissions compared to ad hoc allocation of the at least one RAN resource because of a reduction in electrical power consumption by the devices involved and/or a reduction in the data stored and/or transported.

In act 516, the application programming interface provides access to at least one RAN function of the telecommunications system to the service and/or application. Thus, the services and/or applications can access the RAN functions. The RAN functions enable efficient and reliable wireless communication, and include radio resource control (RRC), radio link control (RLC), medium access control (MAC), and physical layer (PHY). The RRC establishes and maintains the connection between the user equipment and the base station (gNB), configuring the radio parameters and security settings. The RLC handles the segmentation, reassembly, retransmission, and delivery of data packets between the user equipment and the base station. The MAC allocates the radio resources, such as time and frequency slots, to the user equipment, controlling the access and transmission of data on the physical layer. The PHY converts the data into radio signals and vice versa using modulation, coding, and beamforming techniques. The service and/or application is configured to control the RAN functions using the RAN intelligent controllers.

In act 520, the telecommunications system interacts with the service and/or application for the service and/or application to access the telecommunications system using at least one network slice of the telecommunications system. The network slice is identified by a machine learning module embedded within the radio exposure function. For example, the machine learning module is the AI system 600 illustrated and described in more detail with reference to FIG. 6. The telecommunications system enables the multiplexing of virtualized and independent logical networks on the same physical network infrastructure. Each network slice identified by the machine learning module is an isolated end-to-end network tailored to fulfill diverse requirements requested by a particular application.

The telecommunications system thus supports mobile networks that are embrace a plethora of services with very different service level requirements (SLR). The realization of the service-oriented view of the network leverages on the concepts of software-defined networking (SDN) and network function virtualization (NFV) that allow the implementation of flexible and scalable network slices on top of a common network infrastructure. For example, a Network Slice Selection Function (NSSF) of the telecommunications system selects the network slice identified by the machine learning module for the use of the service and/or application. An example NSSF 226 is illustrated and described in more detail with reference to FIG. 2.

In some implementations, the service and/or application is a highly distributed Internet of things (HDIoT) application. The service and/or application executes on devices with sensors, processing ability, software and/or other technologies that connect and exchange data with other devices and systems over the Internet. The HDIoT application executes on a distributed network where the nodes are not collocated but distributed geographically. For example, a node is any active electronic device, including a computer, a phone, a printer, or industrial equipment that is connected to the Internet and as such has an IP address. The telecommunications system creates a virtual network for the user equipment to send telemetry data to the telecommunications system to execute the HDIoT application. For example, the telecommunications system enables the communication between multiple IoT devices, virtual machines (VMs), virtual servers, or other devices across different office and data center locations. In some examples, the multiple IoT devices collect in situ measurements or other data at remote points and automatically transmit it to receiving equipment (telecommunication) for monitoring.

In some embodiments, the telecommunications system detects that the user equipment has violated a security constraint of the telecommunications system. For example, when a network has "hybrid" network functions that support several slices a potential lack of mapping between the application and transport layer identities can create an opportunity for user equipment to attempt to access data and launch denial-of-service attacks across multiple slices. The user equipment can attempt to compromise an edge network function connected to the operator's service-based architecture and risk the loss of sensitive location data. In response to detecting that the user equipment has violated a security constraint of the telecommunications system, the application programming interface prevents the user equipment from accessing the network slice. The network slice blocked corresponds to the RAN resource.

In some implementations, the radio exposure function operates the network slice in accordance with at least one parameter defined by at least one service level agreement of the telecommunications system. The service level agreement can define parameters such as VOIP call quality, Quality of Service parameters (e.g., bandwidth), quality troubleshooting metrics, uptime metrics, and/or technical support obligations (response time).

The machine learning module is trained, based on historical network data of the telecommunications system. Example training methods are illustrated and described in more detail with reference to FIG. 6. The historical network data includes information describing network access speeds, bandwidths, latencies, types of user equipment connected, and/or network slicing. The machine learning module is trained to operate the RAN resource based on operational data received by the radio exposure function. The operational data includes IoT sensor data on network health, faults/events generated by network resources and corrective actions, performance metrics, performance threshold breaches, and/or inventory of slice and service instances. The machine learning module is further trained to allocate RAN resources to user equipment based on the service and/or application and the operational data.

In some implementations, a network data analytics function of the telecommunications system receives operational data from the user equipment and at least one network function of the telecommunications system. The network data analytics function collects data from user equipment, network functions, operations, administration, and maintenance (OAM) systems within the 5G Core, Cloud, and Edge networks. The operational data is utilized for 5G analytics, enabling insights and actions to enhance the overall end-user experience. For example, the machine learning module analyzes the operational data for operating the RAN resources.

Figure 6:
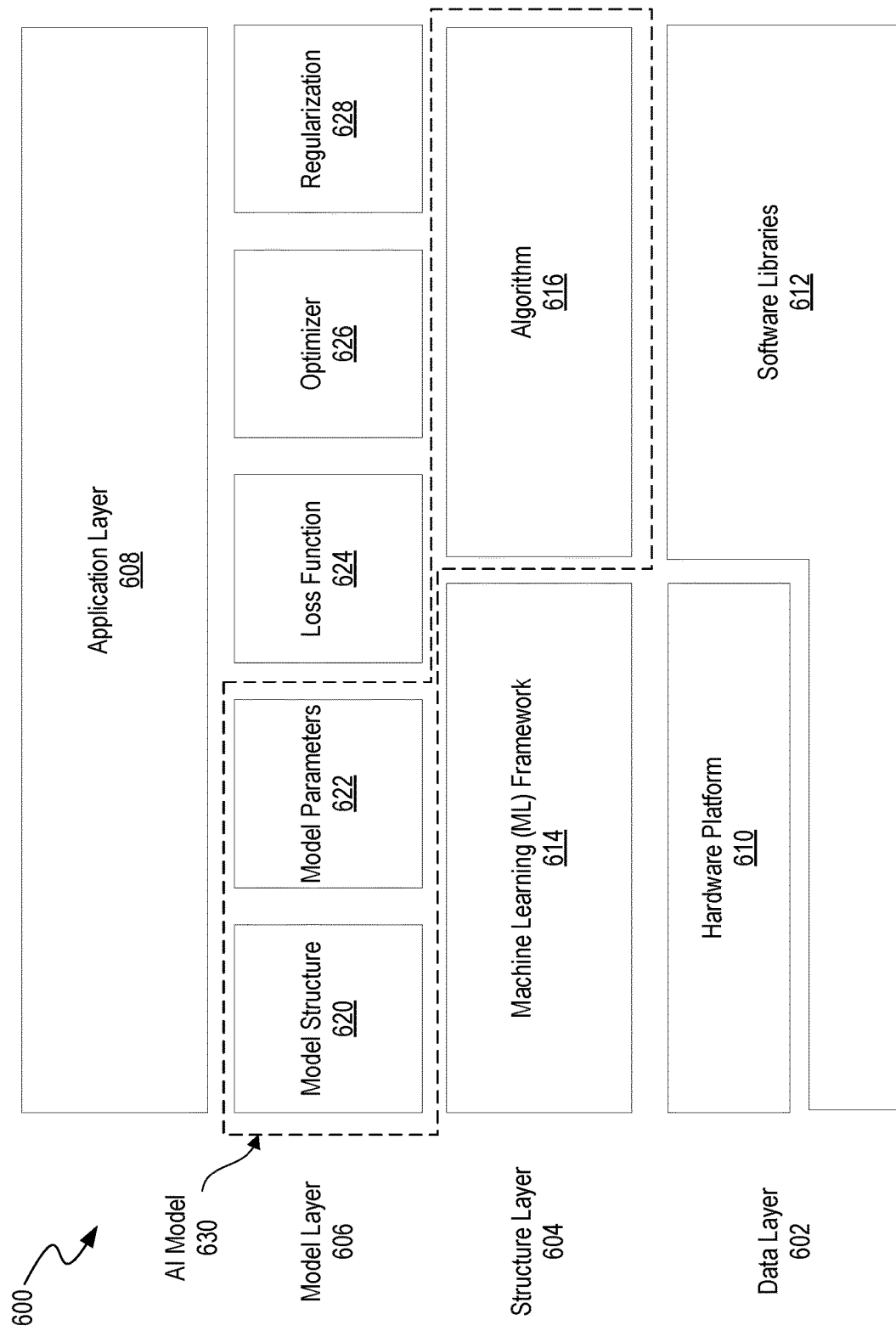
FIG. 6 is a block diagram that illustrates an example artificial intelligence (AI) system that can implement aspects of the present technology.

FIG. 6 is a block diagram that illustrates an example artificial intelligence (AI) system 600 that can implement aspects of the present technology. The AI system 600 is implemented using components of the example computer system 700 illustrated and described in more detail with reference to FIG. 7. For example, the AI system 600 can be implemented using the processor 702 and instructions 708 programmed in the memory 706 illustrated and described in more detail with reference to FIG. 7. Likewise, implementations of the AI system 600 can include different and/or additional components or be connected in different ways.

As shown, the AI system 600 can include a set of layers, which conceptually organize elements within an example network topology for the AI system's architecture to implement a particular AI model 630. Generally, an AI model 630 is a computer-executable program implemented by the AI system 600 that analyzes data to make predictions. Information can pass through each layer of the AI system 600 to generate outputs for the AI model 630. The layers can include a data layer 602, a structure layer 604, a model layer 606, and an application layer 608. The algorithm 616 of the structure layer 604 and the model structure 620 and model parameters 622 of the model layer 606 together form the example AI model 630. The optimizer 626, loss function engine 624, and regularization engine 628 work to refine and optimize the AI model 630, and the data layer 602 provides resources and support for application of the AI model 630 by the application layer 608.

The data layer 602 acts as the foundation of the AI system 600 by preparing data for the AI model 630. As shown, the data layer 602 can include two sub-layers: a hardware platform 610 and one or more software libraries 612. The hardware platform 610 can be designed to perform operations for the AI model 630 and include computing resources for storage, memory, logic and networking, such as the resources described in relation to FIG. 7. The hardware platform 610 can process amounts of data using one or more servers. The servers can perform backend operations such as matrix calculations, parallel calculations, machine learning (ML) training, and the like. Examples of servers used by the hardware platform 610 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 610 can include Infrastructure as a Service (IaaS) resources, which are computing resources, (e.g., servers, memory, etc.) offered by a cloud services provider. The hardware platform 610 can also include computer memory for storing data about the AI model 630, application of the AI model 630, and training data for the AI model 630. The computer memory can be a form of random-access memory (RAM), such as dynamic RAM, static RAM, and non-volatile RAM.

The software libraries 612 can be thought of as suites of data and programming code, including executables, used to control the computing resources of the hardware platform 610. The programming code can include low-level primitives (e.g., fundamental language elements) that form the foundation of one or more low-level programming languages, such that servers of the hardware platform 610 can use the low-level primitives to carry out specific operations. The low-level programming languages do not require much, if any, abstraction from a computing resource's instruction set architecture, allowing them to run quickly with a small memory footprint. Examples of software libraries 612 that can be included in the AI system 600 include Intel Math Kernel Library, Nvidia cuDNN, Eigen, and Open BLAS.

The structure layer 604 can include a machine learning (ML) framework 614 and an algorithm 616. The ML framework 614 can be thought of as an interface, library, or tool that allows users to build and deploy the AI model 630. The ML framework 614 can include an open-source library, an application programming interface (API), a gradient-boosting library, an ensemble method, and/or a deep learning toolkit that work with the layers of the AI system facilitate development of the AI model 630. For example, the ML framework 614 can distribute processes for application or training of the AI model 630 across multiple resources in the hardware platform 610. The ML framework 614 can also include a set of pre-built components that have the functionality to implement and train the AI model 630 and allow users to use pre-built functions and classes to construct and train the AI model 630. Thus, the ML framework 614 can be used to facilitate data engineering, development, hyperparameter tuning, testing, and training for the AI model 630.

Examples of ML frameworks 614 or libraries that can be used in the AI system 600 include TensorFlow, PyTorch, Scikit-Learn, Keras, and Caffe. Random Forest is a machine learning algorithm that can be used within the ML frameworks 614. LightGBM is a gradient boosting framework/algorithm (an ML technique) that can be used. Other techniques/algorithms that can be used are XGBoost, CatBoost, etc. Amazon Web Services is a cloud service provider that offers various machine learning services and tools (e.g., Sage Maker) that can be used for platform building, training, and deploying ML models.

The algorithm 616 can be an organized set of computer-executable operations used to generate output data from a set of input data and can be described using pseudocode. The algorithm 616 can include complex code that allows the computing resources to learn from new input data and create new/modified outputs based on what was learned. In some implementations, the algorithm 616 can build the AI model 630 through being trained while running computing resources of the hardware platform 610. This training allows the algorithm 616 to make predictions or decisions without being explicitly programmed to do so. Once trained, the algorithm 616 can run at the computing resources as part of the AI model 630 to make predictions or decisions, improve computing resource performance, or perform tasks. The algorithm 616 can be trained using supervised learning, unsupervised learning, semi-supervised learning, and/or reinforcement learning.

Using supervised learning, the algorithm 616 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include data received from user equipment. The user may label the training data based on one or more classes and trains the AI model 630 by inputting the training data to the algorithm 616. The algorithm determines how to label the new data based on the labeled training data. The user can facilitate collection, labeling, and/or input via the ML framework 614. In some instances, the user may convert the training data to a set of feature vectors for input to the algorithm 616. Once trained, the user can test the algorithm 616 on new data to determine if the algorithm 616 is predicting accurate labels for the new data. For example, the user can use cross-validation methods to test the accuracy of the algorithm 616 and retrain the algorithm 616 on new training data if the results of the cross-validation are below an accuracy threshold.

Supervised learning can involve classification and/or regression. Classification techniques involve teaching the algorithm 616 to identify a category of new observations based on training data and are used when input data for the algorithm 616 is discrete. Said differently, when learning through classification techniques, the algorithm 616 receives training data labeled with categories (e.g., classes) and determines how features observed in the training data (e.g., RAN resources) relate to the categories (e.g., services and applications). Once trained, the algorithm 616 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 616 is continuous. Regression techniques can be used to train the algorithm 616 to predict or forecast relationships between variables. To train the algorithm 616 using regression techniques, a user can select a regression method for estimating the parameters of the model. The user collects and labels training data that is input to the algorithm 616 such that the algorithm 616 is trained to understand the relationship between data features and the dependent variable(s). Once trained, the algorithm 616 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 616 learns patterns from unlabeled training data. In particular, the algorithm 616 is trained to learn hidden patterns and insights of input data, which can be used for data exploration or for generating new data. Here, the algorithm 616 does not have a predefined output, unlike the labels output when the algorithm 616 is trained using supervised learning. Said another way, unsupervised learning is used to train the algorithm 616 to find an underlying structure of a set of data, group the data according to similarities, and represent that set of data in a compressed format. The telecommunications systems disclosed herein can use unsupervised learning to identify patterns in data received from the network (e.g., to identify particular network slices) and so forth. In some implementations, performance of the radio exposure function that can use unsupervised learning is improved because the radio exposure performs improved allocation of RAN resources to user equipment, as described herein.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 616 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 616 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 616 include factor analysis, item response theory, latent profile analysis, and latent class analysis.

The model layer 606 implements the AI model 630 using data from the data layer and the algorithm 616 and ML framework 614 from the structure layer 604, thus enabling decision-making capabilities of the AI system 600. The model layer 606 includes a model structure 620, model parameters 622, a loss function engine 624, an optimizer 626, and a regularization engine 628.

The model structure 620 describes the architecture of the AI model 630 of the AI system 600. The model structure 620 defines the complexity of the pattern/relationship that the AI model 630 expresses. Examples of structures that can be used as the model structure 620 include decision trees, support vector machines, regression analyses, Bayesian networks, Gaussian processes, genetic algorithms, and artificial neural networks (or, simply, neural networks). The model structure 620 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 620 may include one or more hidden layers of nodes between the input and output layers. The model structure 620 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 622 represent the relationships learned during training and can be used to make predictions and decisions based on input data. The model parameters 622 can weight and bias the nodes and connections of the model structure 620. For instance, when the model structure 620 is a neural network, the model parameters 622 can weight and bias the nodes in each layer of the neural networks, such that the weights determine the strength of the nodes and the biases determine the thresholds for the activation functions of each node. The model parameters 622, in conjunction with the activation functions of the nodes, determine how input data is transformed into desired outputs. The model parameters 622 can be determined and/or altered during training of the algorithm 616.

The loss function engine 624 can determine a loss function, which is a metric used to evaluate the AI model's 630 performance during training. For instance, the loss function engine 624 can measure the difference between a predicted output of the AI model 630 and the actual output of the AI model 630 and is used to guide optimization of the AI model 630 during training to minimize the loss function. The loss function may be presented via the ML framework 614, such that a user can determine whether to retrain or otherwise alter the algorithm 616 if the loss function is over a threshold. In some instances, the algorithm 616 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 626 adjusts the model parameters 622 to minimize the loss function during training of the algorithm 616. In other words, the optimizer 626 uses the loss function generated by the loss function engine 624 as a guide to determine what model parameters lead to the most accurate AI model 630. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 626 used may be determined based on the type of model structure 620 and the size of data and the computing resources available in the data layer 602.

The regularization engine 628 executes regularization operations. Regularization is a technique that prevents over- and under-fitting of the AI model 630. Overfitting occurs when the algorithm 616 is overly complex and too adapted to the training data, which can result in poor performance of the AI model 630. Underfitting occurs when the algorithm 616 is unable to recognize even basic patterns from the training data such that it cannot perform well on training data or on validation data. The regularization engine 628 can apply one or more regularization techniques to fit the algorithm 616 to the training data properly, which helps constraint the resulting AI model 630 and improves its ability for generalized application. Examples of regularization techniques include lasso (L1) regularization, ridge (L2) regularization, and elastic (L1 and L2 regularization).

The application layer 608 describes how the AI system 600 is used to solve problem or perform tasks. In an example implementation, the application layer 608 can include the radio exposure function 440 of the telecommunications system 400.

Computer System

Figure 7:
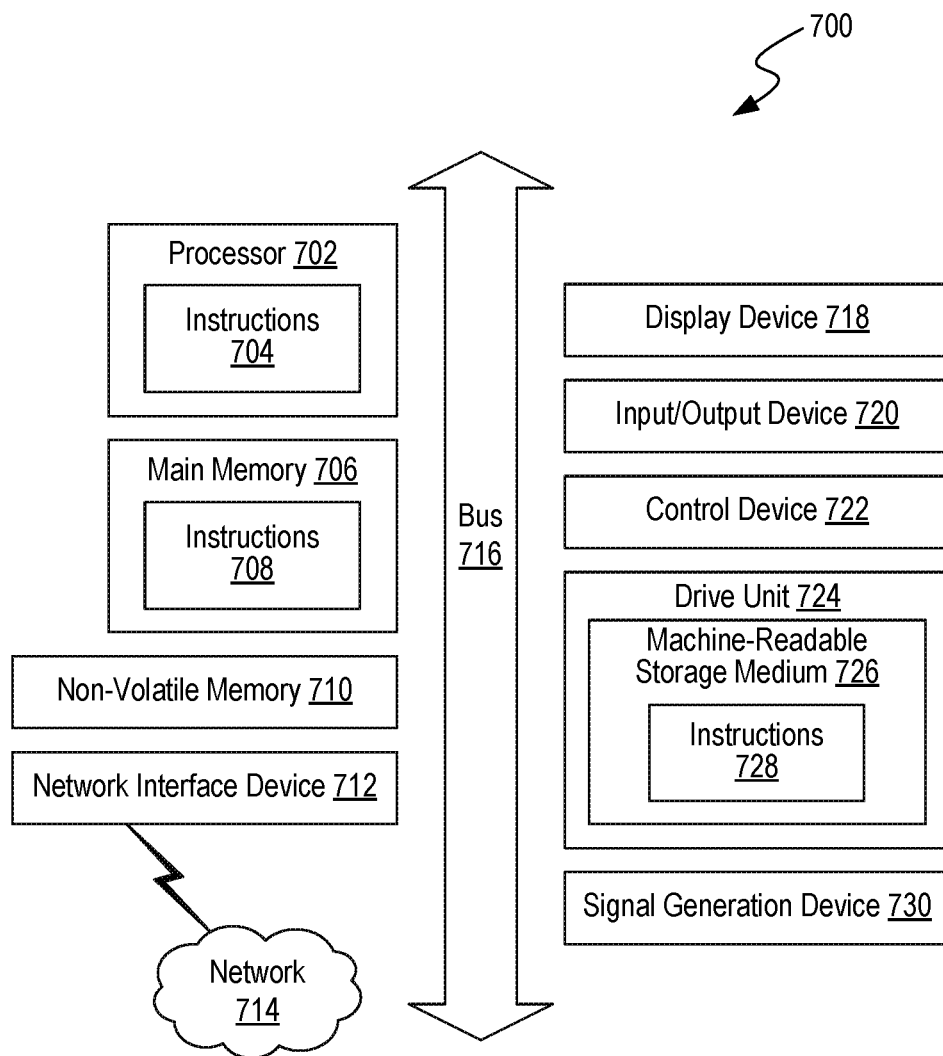
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computer system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computer system 700 to mediate data in a network 714 with an entity that is external to the computer system 700 through any communication protocol supported by the computer system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computer system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computer system 700 to perform operations to execute elements involving the various aspects of the disclosure.

REMARKS

The terms "example," "embodiment," and "implementation" are used interchangeably. For example, reference to "one example" or "an example" in the disclosure can be, but not necessarily are, references to the same implementation;

and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the embodiments. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the examples, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the embodiments, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the embodiments disclosed herein should not be taken to imply that the terminology is being redefined herein to be restricted to any specific characteristics, features, or aspects of the embodiments disclosed herein with which that terminology is associated. In general, the terms used in the following examples should not be construed to limit the embodiments disclosed herein to the specific examples disclosed herein, unless the above Detailed Description explicitly defines such terms. Accordingly, the actual scope of the embodiments disclosed herein encompasses not only the disclosed examples, but also all equivalent ways of practicing or implementing the embodiments disclosed herein under the examples. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the embodiments disclosed herein can be modified to employ the systems, functions, and concepts of the various references described above to provide yet further implementations of the embodiments disclosed herein.

To reduce the number of claims, certain implementations are presented below in certain forms, but the applicant contemplates various aspects of the embodiments disclosed herein in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A computer-implemented method comprising:
receiving, by a programmable radio exposure function of a telecommunications system, at least one mode selection request from at least one service and/or application using the telecommunications system,
wherein the at least one service and/or application is executing on at least one user equipment;
in response to the at least one mode selection request,
selecting, by the programmable radio exposure function, an operational mode from real-time and near-real-time modes of operation of a radio access network (RAN) intelligent controller of the telecommunications system;
allocating, by an application programming interface exposed by the radio exposure function to the at least one service and/or application, at least one RAN resource of the telecommunications system to the at least one user equipment based on the operational mode,
wherein the at least one RAN resource is for executing the at least one service and/or application by the at least one user equipment;
providing, by the application programming interface, access to at least one RAN function of the telecommunications system to the at least one service and/or application,
wherein the at least one service and/or application is configured to control the at least one RAN function using the RAN intelligent controller; and interacting with the at least one service and/or application for the at least one service and/or application to access the telecommunications system using at least one network slice of the telecommunications system identified by a machine learning module embedded within the radio exposure function.

2. The method of claim 1, wherein the at least one service and/or application comprises a highly distributed Internet of things (HDIoT) application, and wherein the method comprises:
creating a virtual network for the at least one user equipment to send telemetry data to the telecommunications system to execute the HDIoT application.

3. The method of claim 1, comprising:
in response to detecting that the at least one user equipment has violated a security constraint of the telecommunications system,
preventing, by the application programming interface, the at least one user equipment from accessing the at least one network slice,
wherein the at least one network slice corresponds to the at least one RAN resource.

4. The method of claim 1, comprising:
operating, by the radio exposure function, the at least one network slice in accordance with at least one parameter defined by at least one service level agreement of the telecommunications system.

5. The method of claim 1, comprising:
training, based on historical network data of the telecommunications system, the machine learning module to perform steps comprising:
operating the at least one RAN resource based on operational data received by the radio exposure function; and
allocating the at least one RAN resource to the at least one user equipment based on the at least one service and/or application.

6. The method of claim 1, comprising:
receiving, by a network data analytics function of the telecommunications system, operational data from the at least one user equipment and at least one network function of the telecommunications system; and
analyzing, by the machine learning module, the operational data for operating the at least one RAN resource.

7. The method of claim 1, comprising:
selecting, by a network slicing selection function of the telecommunications system, the at least one network slice identified by the machine learning module for the at least one service and/or application.

8. A telecommunications system comprising:
at least one hardware processor; and
at least one non-transitory computer-readable storage medium storing instructions, which, when executed by the at least one hardware processor, cause the telecommunications system to:
receive, by a programmable radio exposure function, at least one mode selection request from at least one service and/or application executing on at least one user equipment;
select, by the programmable radio exposure function, an operational mode from real-time and near-real-time modes of operation of a radio access network (RAN) intelligent controller of the telecommunications system;
allocate, by an application programming interface exposed by the radio exposure function to the at least one service and/or application, at least one RAN resource of the telecommunications system to the at least one user equipment based on the operational mode; and
interact with the at least one user equipment for the at least one service and/or application to access the telecommunications system using at least one network slice identified by a machine learning module embedded within the radio exposure function.

9. The telecommunications system of claim 8, wherein the instructions cause the telecommunications system to:
provide, by the application programming interface, access to at least one RAN function of the telecommunications system to the at least one service and/or application,
wherein the at least one service and/or application is configured to control the at least one RAN function using the RAN intelligent controller.

10. The telecommunications system of claim 8, wherein the at least one service and/or application comprises a highly distributed Internet of things (HDIoT) application, and
wherein the instructions cause the telecommunications system to:
create a virtual network for the at least one user equipment to send telemetry data to the telecommunications system to execute the HDIoT application.

11. The telecommunications system of claim 8, wherein the instructions cause the telecommunications system to:
in response to detecting that the at least one user equipment has violated a security constraint of the telecommunications system,
prevent, by the application programming interface, the at least one user equipment from accessing the at least one network slice,
wherein the at least one network slice corresponds to the at least one RAN resource.

12. The telecommunications system of claim 8, wherein the instructions cause the telecommunications system to:
operate, by the radio exposure function, the at least one network slice in accordance with at least one parameter defined by at least one service level agreement of the telecommunications system.

13. The telecommunications system of claim 8, wherein the instructions cause the telecommunications system to:
train, based on historical network data of the telecommunications system, the machine learning module to:
operate the at least one RAN resource based on operational data received by the radio exposure function; and
allocate the at least one RAN resource to the at least one user equipment based on the at least one service and/or application.

14. The telecommunications system of claim 8, wherein the instructions cause the telecommunications system to:
receive, by a network data analytics function of the telecommunications system, operational data from the at least one user equipment and at least one network function of the telecommunications system; and
analyze, by the machine learning module, the operational data for operating the at least one RAN resource.

15. At least one non-transitory computer-readable storage medium storing instructions, which, when executed by at least one data processor of a telecommunications system, cause the telecommunications system to:
receive, by a programmable radio exposure function of the telecommunications system, at least one mode selection request from at least one service and/or application executing on at least one user equipment;

select, by the programmable radio exposure function, an operational mode from real-time and near-real-time modes of operation of a radio access network (RAN) intelligent controller of the telecommunications system;

allocate, by an application programming interface exposed by the radio exposure function to the at least one service and/or application, at least one RAN resource of the telecommunications system to the at least one user equipment based on the operational mode; and provide, by the application programming interface, access to at least one RAN function of the telecommunications system to the at least one service and/or application.

16. The non-transitory computer-readable storage medium of claim 15, wherein the instructions cause the telecommunications system to:

identify, by a machine learning module embedded within the radio exposure function, at least one network slice of the telecommunications system for the at least one service and/or application to access the telecommunications system.

17. The non-transitory computer-readable storage medium of claim 15, wherein the instructions cause the telecommunications system to:

in response to detecting that the at least one user equipment has violated a security constraint of the telecommunications system,
prevent, by the application programming interface, the at least one user equipment from accessing at least one network slice,
wherein the at least one network slice corresponds to the at least one RAN resource.

18. The non-transitory computer-readable storage medium of claim 15, wherein the instructions cause the telecommunications system to:

train, based on historical network data of the telecommunications system, a machine learning module to:
operate the at least one RAN resource based on operational data received by the radio exposure function; and
allocate the at least one RAN resource to the at least one user equipment based on the at least one service and/or application.

19. The non-transitory computer-readable storage medium of claim 15, wherein the instructions cause the telecommunications system to:

receive, by a network data analytics function, operational data from the at least one user equipment and at least one network function of the telecommunications system; and
analyze, by a machine learning module, the operational data for operating the at least one RAN resource.

20. The non-transitory computer-readable storage medium of claim 15, wherein allocating the at least one RAN resource to the at least one user equipment based on the operational mode reduces greenhouse gas emissions compared to ad hoc allocation of the at least one RAN resource.

* * * * *